(12) United States Patent
Ong et al.

(10) Patent No.: US 10,015,736 B2
(45) Date of Patent: Jul. 3, 2018

(54) SCANNING BY DETERMINING AN ACCESS POINT BASED ON RECEIVED DOWNLINK FRAMES

(75) Inventors: Eng Hwee Ong, Singapore (SG); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 298 days.

(21) Appl. No.: 14/400,756

(22) PCT Filed: Jun. 18, 2012

(86) PCT No.: PCT/FI2012/050626
§ 371 (c)(1),
(2), (4) Date: Nov. 12, 2014

(87) PCT Pub. No.: WO2013/190168
PCT Pub. Date: Dec. 27, 2013

(65) Prior Publication Data
US 2015/0131641 A1 May 14, 2015

(51) Int. Cl.
*H04W 48/20* (2009.01)
*H04W 52/24* (2009.01)
(Continued)

(52) U.S. Cl.
CPC .......... *H04W 48/20* (2013.01); *H04W 48/16* (2013.01); *H04W 52/242* (2013.01); *H04W 52/246* (2013.01); *H04W 52/283* (2013.01); *H04W 52/50* (2013.01); *H04W 52/146* (2013.01); *H04W 74/0808* (2013.01)

(58) Field of Classification Search
CPC ............ H04W 48/20; H04W 74/0808; H04W 74/0816; H04W 74/0825
See application file for complete search history.

(56) References Cited

U.S. PATENT DOCUMENTS 6,243,591 B1 * 6/2001 Takemura ............. H04W 52/10
455/522
6,584,325 B1 * 6/2003 Shakhgildian ........ H04W 48/20
455/522
(Continued)

FOREIGN PATENT DOCUMENTS

EP 1670183 6/2006
JP WO 2011086965 A1 * 7/2011 .......... H04J 11/0053
(Continued)

OTHER PUBLICATIONS

International Search Report and Written Opinion received for corresponding Patent Cooperation Treaty Application No. PCT/FI2012/050626, dated Mar. 5, 2013, 11 pages.
(Continued)

*Primary Examiner* — Benjamin Lamont
(74) *Attorney, Agent, or Firm* — Banner & Witcoff, Ltd.

(57) ABSTRACT

A method, apparatus, and computer program is presented for scanning in a wireless network. A wireless device receives a downlink frame from two access points, the downlink frames indicating their respective transmission powers. The wireless device then determines the closest access point and a transmission power sufficient to reach that access point. Then, the wireless device carries out transmission of a probe request with the determined transmission power.

20 Claims, 3 Drawing Sheets

(51) Int. Cl.
*H04W 52/28* (2009.01)
*H04W 52/50* (2009.01)
*H04W 48/16* (2009.01)
H04W 74/08 (2009.01)
H04W 52/14 (2009.01)

(56) References Cited

U.S. PATENT DOCUMENTS

| | | | | |
|---|---|---|---|---|
| 7,339,906 | B1* | 3/2008 | Dahlby | H04W 76/02 370/329 |
| 8,879,471 | B2 | 11/2014 | Kneckt et al. | |
| 8,879,992 | B2 | 11/2014 | Kneckt et al. | |
| 2006/0009250 | A1* | 1/2006 | Lee | H04W 52/10 455/522 |
| 2006/0025136 | A1* | 2/2006 | Fujita | H04W 74/0816 455/436 |
| 2006/0094370 | A1 | 5/2006 | Nguyen | |
| 2007/0242621 | A1 | 10/2007 | Nandagopalan et al. | |
| 2008/0181184 | A1 | 7/2008 | Kezys | |
| 2009/0185518 | A1 | 7/2009 | Viswanath | |
| 2010/0172291 | A1* | 7/2010 | Kim | H04W 48/20 370/328 |
| 2011/0176468 | A1* | 7/2011 | Sridhara | G01S 5/021 370/311 |
| 2012/0057494 | A1* | 3/2012 | Walton | H04W 74/0808 370/252 |
| 2012/0155310 | A1* | 6/2012 | Kreuzer | H04W 52/146 370/252 |
| 2012/0282889 | A1* | 11/2012 | Tanaka | H04J 11/0053 455/405 |
| 2013/0070739 | A1* | 3/2013 | McCann | H04W 48/16 370/338 |
| 2013/0109314 | A1 | 5/2013 | Kneckt et al. | |
| 2013/0237216 | A1 | 9/2013 | Ong et al. | |
| 2014/0242985 | A1 | 8/2014 | Kneckt et al. | |

FOREIGN PATENT DOCUMENTS

| | | |
|---|---|---|
| WO | 2011086097 | 7/2011 |
| WO | 2013/062586 A1 | 5/2013 |
| WO | 2013/132135 A1 | 9/2013 |

OTHER PUBLICATIONS

Extended European Search Report received for corresponding European Patent Application No. 12879259.5, dated Jan. 4, 2016, 5 pages.

* cited by examiner

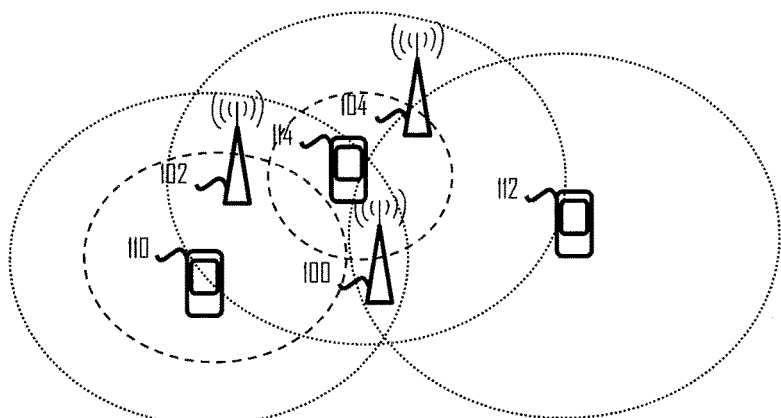
Fig 3
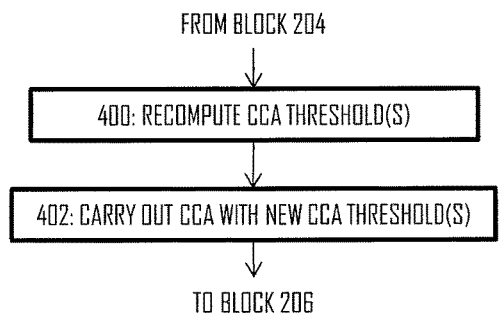
Fig 4
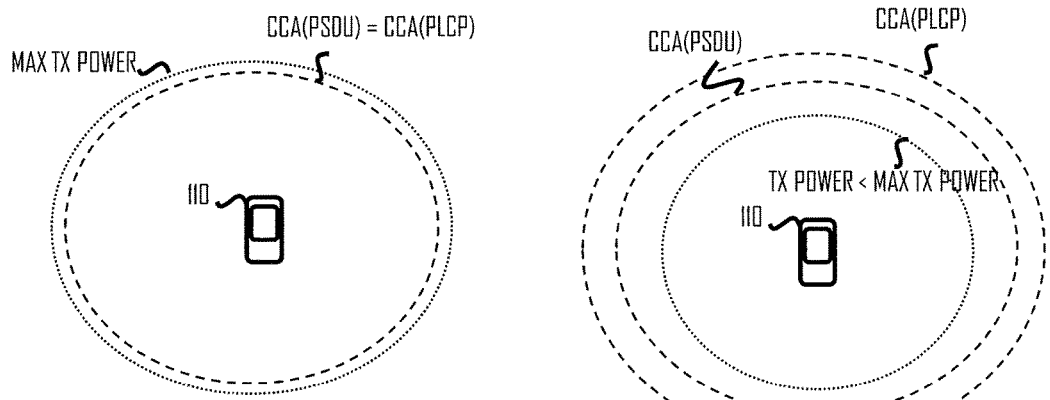
Fig 5A
Fig 5B

SCANNING BY DETERMINING AN ACCESS POINT BASED ON RECEIVED DOWNLINK FRAMES

RELATED APPLICATION

This application was originally filed as PCT Application No. PCT/FI2012/050626 filed Jun. 18, 2012.

FIELD

The invention relates to the field of wireless communications and, particularly, to network discovery in a wireless communication system.

BACKGROUND

A terminal device of a wireless communication system may be configured to scan for available communication channels before initiating a link setup with an access point or another terminal device of a wireless network. The scanning may comprise passive scanning in which the terminal device scans for broadcast messages or active scanning in which the terminal device transmits a scanning request message and receives a response to the scanning request message.

BRIEF DESCRIPTION

The invention is defined by appended independent claims.
Embodiments of the invention are defined in dependent claims.

LIST OF DRAWINGS

Embodiments of the present invention are described below, by way of example only, with reference to the accompanying drawings, in which FIG. 1 illustrates an example of a wireless communication scenario to which embodiments of the invention may be applied;

FIG. 3 illustrates the effect of an embodiment of FIG. 2;

FIG. 4 illustrates a process for mapping the transmission power to carrier sensing threshold(s) according to an embodiment of the invention;

Figure 5C:
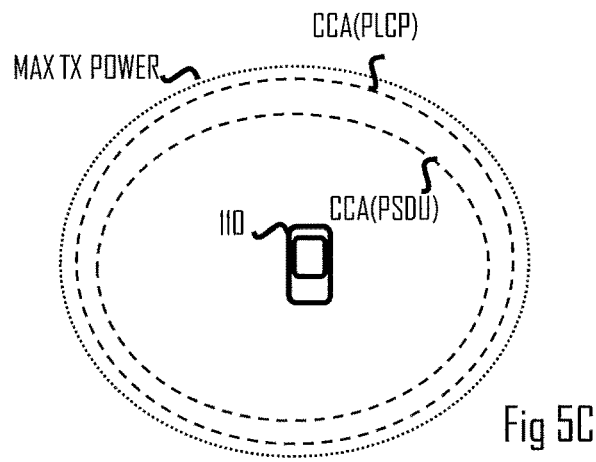
Figure 6:
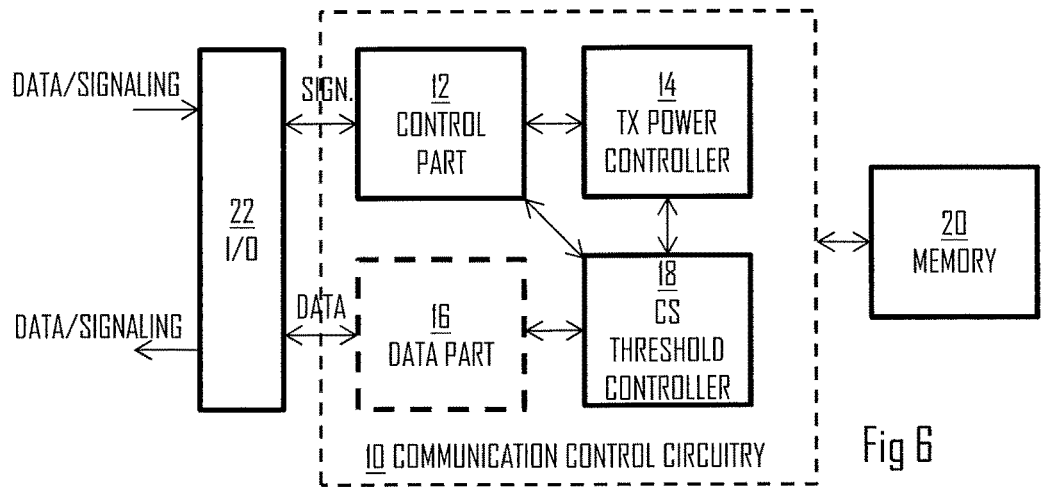
Figure 7:
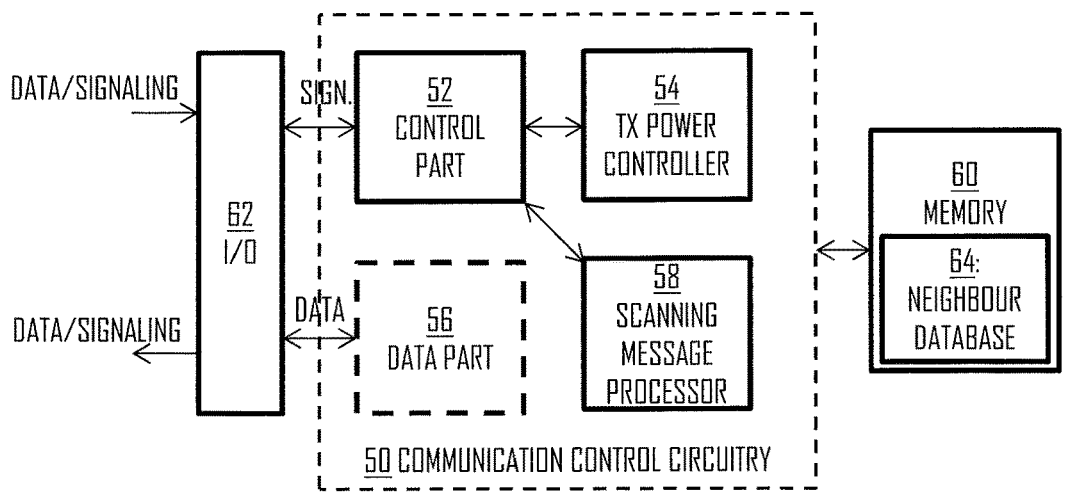

FIGS. 5A, 5B, and 5C illustrate ranging effect of some embodiments of the invention; and FIGS. 6 and 7 illustrate block diagrams of apparatuses according to some embodiments of the invention.

DESCRIPTION OF EMBODIMENTS

The following embodiments are examples. Although the specification may refer to "an", "one", or "some" embodiment(s) in several locations, this does not necessarily mean that each such reference is referring to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
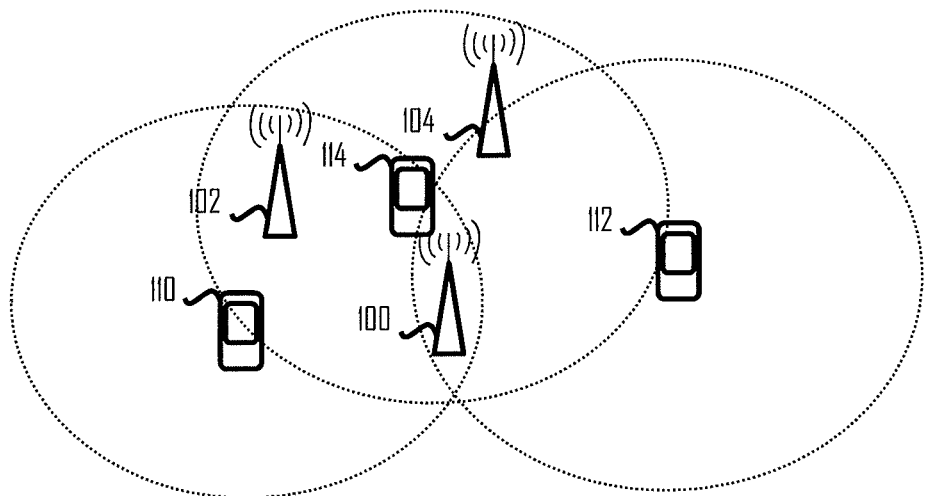

A general wireless communication scenario to which embodiments of the invention may be applied is illustrated in FIG. 1. FIG. 1 illustrates wireless communication devices comprising a plurality of access points (AP) 100, 102, 104 and a plurality of wireless terminal devices (STA) 110, 112, 114. Each base station may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP. The APs 100 to 104 may also provide access to other networks, e.g. the Internet. In another embodiment, the BSS may comprise a plurality of APs to form an extended service set (ESS). While embodiments of the invention are described in the context of the above-described topologies of IEEE 802.11 and, particularly, IEEE 802.11ac and IEEE 802.11ai, it should be appreciated that these or other embodiments of the invention may be applicable to networks based on other specifications, e.g. other versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards. Some embodiments may be applicable to networks having features under development by IEEE 802.19 task group 1 (TG1).

IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Every device attempting to gain a TXOP is reducing a backoff value while the primary channel is sensed to be idle for a certain time interval, for instance 9 microseconds. When the backoff value reaches zero, the STA gains the TXOP and starts transmission. If another STA gains the TXOP before that, the backoff value computation may be suspended, and the STA continues the backoff computation after the TXOP of the other STA has ended and the primary channel is sensed to be idle. The time duration (the backoff value) may not be decremented during the TXOP of the other STA, but the time duration that already lapsed before the suspension may be maintained, which means that the device now has a higher probability of gaining the TXOP. A secondary channel may be used in the transmission if it has been free for a determined time period (may be the same or different time period than that used for gaining the TXOP) just before TXOP start time in order for the contending device to take the secondary channel in use.

Some IEEE 802.11 networks utilize an enhanced version of the CSMA/CA where prioritized transmissions are taken into account. An example, of such an enhanced CSMA/CA is enhanced distributed channel access (EDCA) where the backoff value and a contention window (a time period when the channel contention is carried out) are selected to prioritize access classes having a higher priority, e.g. a higher quality-of-service classification. The EDCA is also carried out on the primary channel, and a STA winning the contention may expand the transmission band to the secondary channel(s) if the secondary channel(s) have been sensed to be available, e.g. through clear-channel assessment (CCA) for a determined time period, e.g. a point coordination function inter-frame space (PIFS) duration before the start of the TXOP. The STA (or AP) may carry out the CCA procedure in order to determine whether the channel is free or busy. Upon detecting radio energy that exceeds a preset threshold on the channel, the STA may determine that the channel is busy and prevent the transmission. On the other hand, if the STA detects no radio energy exceeding the threshold on the channel during the determined time period, it may carry out the transmission. The STA may use a single threshold in the CCA procedure but, in some embodiments, a plurality of thresholds and frame detection are applied. Upon detecting a transmission on the channel, the STA may determine whether the on-going transmission is a frame header or frame payload portion. An example of the frame header is a physical layer convergence protocol (PLOP) header, while an example of the frame payload portion is a physical layer service data unit (PSDU). Then, the STA may determine a threshold for use with the detected transmission. For example, a first threshold may be applied to the frame header while a second, different threshold may be applied to the frame payload portion. The first threshold may be denoted by a carrier sensing header threshold, while the second threshold may be denoted by a carrier sensing data unit threshold. By default, the carrier sensing data unit threshold may be −62 decibels with respect to one milliwatt (dBm), while the carrier sensing header threshold may be −82 dBm. Accordingly, the STA may be more sensitive with respect to frame headers than with respect to frame payload portions. This ensures that the headers will less likely collide with other impending transmissions, while spatial reuse of the channel is encouraged for payload portions.

A virtual carrier sensing function is provided by the provision of a network allocation vector (NAV) which is used to reserve a channel for the duration of the TXOP. Most of the transmitted frames comprise a duration field which can be used to reserve the medium, or provide duration of the NAV protection, for the duration indicated by the value of the duration field. In practice, the NAV is a timer that indicates the amount of time the medium will be reserved. In a typical operation, the transmitting station (STA) will set the value of the duration field according to the time for which it expects to use the medium while all receiving STAs, except the intended receiver, update their NAV appropriately with the information in the duration field and count down from the NAV to zero before starting the channel contention. The virtual carrier sensing function indicates that the medium is busy when NAV is non-zero and idle when NAV is zero. The NAV may be set to protect frame transmissions. The communication devices obtain the NAV on the primary channel of the BSS.

IEEE 802.11ai task group is creating principles for fast initial link setup (FILS). One aspect of the principles is to enable faster and more precise AP and network discovery. Some principles relate to passive scanning in which a scanning device, e.g. a STA, passively scans channels for any beacon, management, or advertisement frames. Other principles relate to active scanning in which the scanning device actively transmits a scanning request message, e.g. a Probe Request message or a generic advertisement service (GAS) request, in order to query for present APs or networks. The probe request may also set some conditions that a responding device should fulfil in order to respond to the probe request. In some embodiments, the scanning device may be called a requesting device or a requesting apparatus. Responding devices may transmit scanning response messages, e.g. Probe Response messages, in response to the scanning request message, wherein the scanning response message may contain information on the responding device, its network, and other networks. Embodiments of the scanning enhancements described herein encompass the network discovery signalling, probe request-response processes, as well as GAS request-response processes.

Let us now return to FIG. 1 to consider a problem in such a wireless communication scenario where there are multiple APs 100 to 104 relatively close to each other. Dotted lines around each STA 110 to 114 illustrate a transmission range of signals transmitted by each STA 110 to 114. Upon transmitting a probe request from a given STA, APs in the transmission range of the STA respond with a probe response. For example, APs 100, 102 respond to a probe request transmitted by the STA 110, APs 100, 104 respond to a probe request transmitted by the STA 112, and all APs 100 to 104 respond to a probe request transmitted by the STA 114. It can be seen that as the number of APs and/or STAs in the area increases, the exchange of probe requests and associated probe responses start to consume the medium resources significantly.

Figure 2:
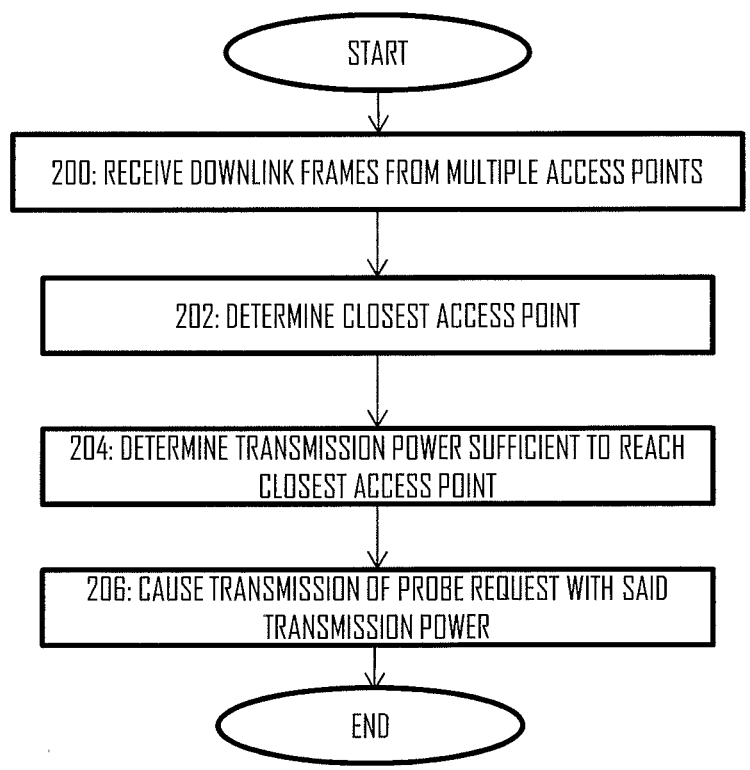
FIG. 2 illustrates a signalling diagram of a scanning process according to an embodiment of the invention.

FIG. 2 illustrates an embodiment of a process for limiting the number of devices responding to the probe request. The process may be carried out in a wireless device carrying out a network discovery procedure, e.g. STA 110 to 114. Referring to FIG. 2, block 200 comprises receiving, by the wireless device, a first downlink frame from a first access point, wherein the first downlink frame indicates a first transmission power used for transmitting the first downlink frame. Block 200 also comprises receiving, by the wireless device, a second downlink frame from a second access point, wherein the second downlink frame indicates a second transmission power used for transmitting the second downlink frame. Further downlink frames may also be received from other access points in block 200. Block 202 comprises determining, based on the received first downlink frame and the second downlink frame and associated the first transmission power and the second transmission power, which one of the first access point and the second access point is closest to the wireless device. If further downlink frames are received in block 200, they may also be taken into consideration in determining the closest access point in block 202.

Block 204 comprises determining, based on the received first downlink frame and the second downlink frame and correspondingly the first transmission power and the second transmission power, an uplink transmission power sufficient to reach the access point closest to the wireless device. In block 206, the wireless device is configured to transmit a probe request with the determined transmission power.

The wireless device may thus limit the transmission power used for transmitting the probe request in order to reduce the number of access points receiving the probe request. As a consequence, the number of access points responding to the probe request is also reduced, which results in reduced congestion in the channel(s) used for transmitting the probe responses.

In some embodiments, the two downlink frames or even a single downlink frame may be received from a single access point and the wireless device may choose a transmission power that is sufficient to reach that access point. Thus, the same effect of reducing the number of responding devices may be achieved when other access points further away from the wireless device are not able to detect the probe request. In such embodiments, the wireless device may reduce the transmission power to be lower than a maximum transmission power available or allowed for use on the channel but maintain other parameters, e.g. a modulation and coding scheme, intact or as used when transmitting with the maximum power. Accordingly, the wireless device may even use the strongest modulation and coding scheme (most resilient to errors) available while reducing the transmission power.

There are several embodiments for determining the transmission power of the probe request. In an embodiment, the transmission power is determined such that it reaches only the closest access point but no other access point. A safety margin may be provided in the transmission power to ensure that the closest access point receives the probe request. This transmission power may be derived by computing a path loss or attenuation of the downlink frame received from the closest access point. The path loss may be estimated from the known transmit power of the downlink frame and measured reception power of the downlink frame by using a state-of-the-art path loss estimation algorithm. The path loss may be represented as $L_{path}(dB)=10 \log(P_t/P_r)$ where $P_t$ is the transmission power of the downlink frame and $P_r$ is the measured reception power of the downlink frame, both measured in dBm respectively, as an example. The transmission power for the probe request message may be computed according to the following Equation (1):

$$P_t^{new}=L_{path} \text{ (dB)}+\text{SNR (dB)} \quad (1)$$

where SNR is a minimum signal-to-noise power ratio (in decibels) required to receive the probe request correctly in the access point. The SNR value may be provided as a default value in the wireless device, or it may be contained in the downlink frame received from the closest access point.

In another embodiment, the transmission power is determined such that a subset of closest access points receives the probe request, wherein the subset comprises more than one access point, and wherein at least one of the most remote access points is intended not to receive the probe request. This may be carried out by sorting the access points from which the downlink frame has been received into an order of an estimated radio distance, e.g., path loss between each access point and the wireless device. Then, the number or portion of access points to be reached with the probe request is selected, and the access point corresponding to that number or portion in the sorted list of access points is selected for the computation of the appropriate transmission power. The path loss between that access point and the wireless device may then be computed and the transmission power determined according to Equation (1), for example. For example, let us assume that the wireless device has received downlink frames from ten access points and it chooses to reach only four closest access points with the probe request. It may first compute the path loss estimates for each access point in order to determine the 'radio distances' to each access point. Then, the path loss estimates may be sorted into an ascending order and the fourth path loss estimate representing the path loss between the wireless device and fourth closest access point may be selected. The transmission power of the probe request may then be computed by using this path loss estimate.

The reduction in the number of probe responses may be achieved even when the transmission power of the probe request is reduced such that only the most remote access point does not receive the probe request. FIG. 3 illustrates the effect of reducing the transmission power of the probe request with respect to maintaining the maximum transmission power. The maximum transmission power of the STAs 110 to 114 is indicated with the dotted line, while the reduced transmission power is shown by a dashed line around STAs 110, 114. In this example, let us assume that the STA 112 chooses to maintain the maximum transmission power in order to reach the closest access point, and both access points 100, 104 have relatively the same radio distance to the wireless device so they are both likely to receive the probe request. However, the STAs 110, 114 reduce their transmit powers and, as a consequence, only AP 102 is able to detect the probe request transmitted by the STA 110, while only the AP 104 is able to detect the probe request transmitted by the STA 114. Comparing with the situation of using the maximum transmission power the total number of probe responses is reduced from seven to four, resulting in reduction of the signalling caused by the probe responses by 43%.

In the above-described embodiments, the estimation of the closest access point or, in general, the estimation of the distances between the wireless device and the access points is carried out by using the radio distance computed from the transmission and reception powers of each downlink frame. In an embodiment, other location or distance information is used as an additional input or instead of the radio distance. In an embodiment, at least some of the downlink frames received from the access points comprises location information of the access point in the form of geolocation coordinates. The geolocation coordinates may be provided in any manner, e.g. as coordinates of a global navigation satellite system (GNSS) or as system-specific location coordinates used in the wireless network. The wireless device may use the location information acquired from the received downlink frames in order to improve the estimation of the distance between the wireless device and the access point. In another embodiment, the location information of the wireless device itself and the location information of the access points acquired from the received downlink frames are used without the radio distance in the determination of the closest access point. In such an embodiment, the wireless device may compute the distance between itself and an access point from the difference between the location information of the wireless device and the location information contained in the received downlink frame, and the access point having the shortest distance is determined to be the closest access point.

In an embodiment, the wireless device limiting its transmission power for the probe request message is configured to adjust at least one of its CCA thresholds on the basis of the transmission power of the probe request message. Accordingly, the wireless device may apply adjusted CCA threshold(s) for a CCA procedure carried out when transmitting the probe request with the limited transmission power. FIG. 4 illustrates an embodiment of the modification of the process of FIG. 2 when applying the adjusted CCA threshold(s). The steps of FIG. 4 may be carried out between block 204 and 206 of FIG. 2 which is after determining the transmission power of the probe request message but before transmitting the probe request message. Referring to FIG. 4, after the transmission power has been computed in block 204, the new CCA threshold(s) is/are computed in block 400 on the basis of the transmission power. Each transmission power value may be mapped to a corresponding CCA threshold value(s) in order to ease computational complexity of the wireless device. Below, some embodiments for defining the interrelation between the transmission power and the CCA threshold(s) are provided. In block 402, the CCA procedure is carried out with the new CCA threshold value(s) before transmitting the probe request with the limited transmission power.

In an embodiment where the wireless device uses only one CCA threshold, that threshold value may be adjusted in block 400. In another embodiment where the wireless device uses a plurality of CCA thresholds, e.g. a separate CCA threshold for the header and payload portions, only one of the CCA thresholds, a subset of the CCA thresholds, or all CCA threshold values may be adjusted in block 400. The adjustment of the multiple CCA threshold values may also be carried out according to a different adjustment principle. For example, one of the thresholds may be directly proportional to the limited transmission power, e.g. the lower the transmission power, the lower the threshold. As the threshold for preventing the transmission of the probe request is lowered together with the reduction in the transmission power, this makes the sensitivity of the wireless device to be inversely proportional to the transmission power, e.g. the lower the transmission power, the more sensitive the wireless device is with respect to avoiding colliding transmissions. Another threshold may be inversely proportional to the limited transmission power, e.g. the higher the transmission power, the lower the threshold and vice versa. As the threshold for preventing the transmission of the probe request is lowered as the transmission power increases, this makes the sensitivity of the wireless device to be directly proportional to the transmission power, e.g. the higher the transmission power, the more sensitive the wireless device is with respect to avoiding colliding transmissions.

Let us now consider some embodiments of the interrelation between the transmission power of the probe request and the associated CCA threshold(s). The described embodiments assume that the wireless device employs the carrier sensing header threshold $CCA_{thres}^{PLCP}$ and the carrier sensing data unit threshold $CCA_{thres}^{PSDU}$ having different threshold values. In an embodiment, the reduction in the CCA threshold may be computed on the basis of the default transmission power, e.g. a maximum transmission power of the wireless device, and the limited transmission power computed in block 204. Additionally, the default values of the $CCA_{thres}^{PLCP}$ and $CCA_{thres}^{PSDU}$ may be taken into account. First, an absolute value of a difference between the $CCA_{thres}^{PLCP}$ and $CCA_{thres}^{PSDU}$ may be computed as:

$$CCA_{thres}^{\Delta}=|CCA_{thres}^{PLCP}-CCA_{thres}^{PSDU}| \qquad (2)$$

Then, an adjustment value for the carrier sensing data unit threshold may be computed as:

$$ECS_{thres}^{PSDU} = CCA_{thres}^{\Delta} \times \frac{P_t^{new}}{P_t^{ref}}, \qquad (3)$$

where $P_t^{new}$ the limited transmission power computed in block 204 and $P_t^{ref}$ is the default or reference transmission power used by the wireless device to transmit frames other than the probe request, e.g. the maximum transmission power of the wireless device. The adjustment value may also be called "enhanced carrier sensing factor". The new carrier sensing data unit threshold may be computed according to the following Equation (4):

$$CCA_{thres,new}^{PSDU}=CCA_{thres}^{PSDU}-ECS_{thres}^{PSDU} \qquad (4)$$

Referring to Equations (3) and (4), the decrease in the carrier sensing data unit threshold $CCA_{thres}^{PSDU}$ by the amount defined in $ECS_{thres}^{PSDU}$ is directly proportional to the reduced transmission power computed in block 204. The higher the transmission power $P_t^{new}$, the higher is the additional reduction in the default value of the carrier sensing data unit threshold $CCA_{thres}^{PSDU}$ and the more sensitive the wireless device is during the CCA procedure preceding the transmission of the probe request. In other words, as the transmission range of the probe request increases, the detection range for detecting and avoiding colliding data unit transmissions also increases. The collision detection and avoidance range with respect to the payload portions of frames may thus be understood as following the range of the transmitted probe request.

Furthermore, Equations (3) and (4) may be understood such that when the wireless device uses the default transmission power to transmit the probe request, the carrier sensing data unit threshold $CCA_{thres}^{PSDU}$ becomes equal to the carrier sensing header threshold $CCA_{thres}^{PLCP}$. The carrier sensing data unit threshold may thus be scaled between its default value and the threshold value of the carrier sensing header threshold according to the transmission power of the probe request. Let us consider Equations (2) to (4) by using specifications of an IEEE 802.11u for a 20 Megahertz (MHz) channel, wherein $CCA_{thres}^{PSDU}=-62$ dBm and $CCA_{thres}^{PLCP}=-82$ dBm. Accordingly, when the transmission power $P_t^{new}$ determined in block 204 is the maximum transmit power, $ECS_{thres}^{PSDU}=CCA_{thres}^{\Delta}=20$ dB and $CCA_{thres,new}^{PSDU}=CCA_{thres}^{PLCP}=-82$ dBm This results in that the detection ranges for both the header and payload portions of frames are equal (see FIG. 5A). On the other hand, if the transmission power $P_t^{new}$ determined in block 204 is very low, $ECS_{thres}^{PSDU}$ becomes negligible, and $CCA_{thres,new}^{PSDU} \sim CCA_{thres}^{PSDU}=-62$ dBm. The effect is illustrated in FIG. 5B where the detection range for the payload portions of frames (PSDU) reduces with respect to the detection range of the header portions of the frames (PLOP).

In an embodiment, the same value of $ECS_{thres}^{PSDU}$ may be applied to the carrier sensing header threshold as well, and the new carrier sensing header threshold may be computed as:

$$CCA_{thres,new}^{PLCP}=\max(RX_{sens},CCA_{thres}^{PLCP}-ECS_{thres}^{PDSU}) \qquad (5)$$

where $RX_{sens}$ is reception sensitivity of a radio receiver of the wireless device. The function of the maximum function is to not use a sensitivity that is beyond the physical capability of the radio receiver of the wireless device. Accordingly, the collision detection and avoidance range with respect to the frame headers may also be understood as following the range of the transmitted probe request.

In another embodiment, the carrier sensing header threshold is computed according to a different principle than that used for the carrier sensing data unit threshold. The carrier sensing header threshold may be computed by first computing an adjustment value as:

$$ECS_{thres}^{PLCP} = 10\log\frac{P_t^{ref}}{P_t^{new}} \quad (6)$$

where the transmission powers are in this Equation represented in Watts instead of dBm. Equally, the presentation could be in dBm and Equation (6) could be modified accordingly. Then, the new carrier sensing header threshold may be computed as:

$$CCA_{thres,new}^{PLCP} = \max(RX_{sens}, CCA_{thres}^{PLCP} - ECS_{thres}^{PLCP}) \quad (7)$$

Let us consider the boundaries of the adjusted carrier sensing header threshold. When the transmission power of the probe request is the maximum power, the wireless device uses the default value of the carrier sensing header threshold, e.g. −82 dBm. On the other hand, when the transmission power of the probe request is very low, the value of the adjustment value or the enhanced carrier sensing factor $ECS_{thres}^{PLCP}$ becomes high which leads to high reduction in the carrier sensing header threshold value $CCA_{thres,new}^{PLCP}$. As a consequence, the wireless device becomes highly sensitive to detecting colliding frame header transmissions. As a consequence, the lower the transmission power of the probe request message, the more likely the wireless device is to defer the transmission of the probe request message because of the detection of a colliding frame header transmission.

Increasing the collision avoidance sensitivity of the wireless device when decreasing the transmit power may be used as a congestion control mechanism. Accordingly, when the medium is congested, the wireless device is thus encouraged to defer its probe request transmission while using a lower transmission power. One the other hand, when the medium is not congested, the wireless device may transmit its probe request with higher transmission power and close to default sensitivity (of −82 dBm) towards the other transmissions. It should, however, be appreciated that the carrier sensing header threshold may also be adjusted in a similar manner as the carrier sensing data unit threshold, e.g. increasing the sensitivity by increasing the transmission power as in expression (5).

FIG. 5C illustrates an embodiment where the adjustment value ECS is not used but different (default) values are applied to the carrier sensing header threshold and the carrier sensing data unit threshold when using the maximum transmission power. Accordingly, the wireless device is more sensitive to avoiding collisions with frame headers than with payload portions.

Upon receiving the probe request with sufficient power level from the scanning STA, the AP may transmit a probe response frame with a default transmission power, or a similar transmission power selection may be used for the probe response message as well. The probe request may comprise an indication of the transmission power of the probe request message, and the access point may compute the path loss estimate, determine the minimum SNR required for receiving the probe response message correctly in the scanning STA, and transmit the probe response message with the determined, reduced transmission power that is sufficient to reach the scanning STA. In addition, the probe response frame may include a Neighbor Report element identifying at least one neighboring access point and, optionally, operational parameters of the at least one reported neighboring access point. Accordingly, the scanning STA may solicit a single probe response by transmitting the probe request frame to the closest AP with sufficient power, or by soliciting a reduced number of probe responses by transmitting the probe request frame to a reduced set of closest APs. The responding AP(s) may include the neighbor report in response to the detected probe request frame from the scanning STA. The neighbor report ensures that the scanning STA may acquire information of the surrounding APs by transmitting one probe request frame, provided of course that the probe request frame is successfully received.

Table 1 below shows an example of a Neighbor Report element added to the probe response message.

TABLE 1

| El ID | Length | BSSID | BSSID Info | Op Class | Ch # | PHY Type | Optional |
|-------|--------|-------|------------|----------|------|----------|----------|
| 1 | 1 | 6 | 4 | 1 | 1 | 1 | Variable |

An Element ID (El ID) field identifies the information element "Neighbor Report", and a Length field specifies the length of the Neighbor Report element. A BSS identifier (BSSID) field identifies a neighboring BSS being reported by the neighbor report element, a BSSID Information (BSSID Info) field may specify information of the BSS in subfields, such as AP Reachability, Security, and Capabilities, defined in the IEEE 802.11-2012 Standard, an Operating Class (Op Class) field may specify channel spacing or similar parameters of the BSS, a Channel Number (Ch #) field may identify a primary channel index of the BSS, a Physical Layer Type (PHY Type) field may specify physical layer parameters of the BSS, and an Optional field may comprise any other information. This type of neighbor report element may be included in the probe response for each neighboring BSS being reported. The neighbor report element may be appended to the probe response message when a "More Data" indicator, e.g. a bit, in a Medium Access Control (MAC) header of the probe request frame is set to 1 or, in general, to a first value. The scanning STA may set the More Data indicator to the first value when dot11FILSActivated is true and the probe request frame will be transmitted with the transmission power determined for the probe request in the above-described manner. Otherwise, when the More Data indicator is set to zero or, in general, to another value, the access point may exclude the neighbor report element from the probe response frame.

The downlink frame used for determining the closest AP(s) may be a (short) beacon frame, a measurement pilot frame, another advertisement frame transmitted by the APs, or even a data frame. The short beacon frame may be defined as a beacon frame containing a reduced set of information with respect to a conventional beacon frame. Access points may broadcast short beacon frames in some situations and conventional beacon frames in other situations. The data frame may be addressed to another device than the wireless device carrying out the scanning. The downlink frames may be transmitted periodically or generally in a regular manner to enable their utilization for the passive scanning. The downlink frame may comprise a following field to convey at least the transmission power of the downlink frame:

TABLE 2

| El ID | Length | Org ID | X | Y | TX Pow | Z | Rad | RefOS |
|-------|--------|--------|---|---|--------|---|-----|-------|
| 1 | 1 | j | 4 | 4 | 1 | 4 | 4 | 4 |

The number below each field indicates its length in octets. An Element ID (El ID) field identifies the information element "Transmit Power and Geolocation", and a Length field specifies the length of the Transmit Power and Geolocation element. An Organization Identifier (Org ID) field shall contain a public organizationally unique identifier (OUI) assigned by the IEEE. The length of the Organization Identifier field is j octets. These first three fields may be mandatory and, additionally, the information element may comprise at least a Transmit Power (TX Pow) field indicating the transmission power (TX Pow) of the downlink frame comprising the field. The length "n" of an information field excluding the Element ID and the Length fields may be constrained by j≤n≤255 octets. The length of a vendor-specific content comprising the information fields excluding the Element ID, Length, and Organization ID fields may be n−j octets.

As described above, the information field may comprise the geographical location of the access point transmitting the downlink frame. For that purpose, the information field may comprise an X-Coordinate field containing a 4 octet single precision floating point value identifying an X coordinate of the access point. A Y-Coordinate field may similarly contain a 4 octet single precision floating point value specifying a Y coordinate of the access point. Additionally, the field may comprise a Z-Coordinate field specifying a Z coordinate of the access point representing the location of the access point in height direction to provide a three-dimensional location in Cartesian coordinates.

The Transmit Power field may be a signed integer complement of two and 1 octet in length. It may define a transmission power less than or equal to the maximum transmission power of the access point and indicate the actual power as measured at the output of the antenna connector in units of dBm by a STA when transmitting the frame containing this field. This may be understood as the output power of the transceiver minus the total transmit loss which may comprise cable and insertion losses.

A Radius field may be used with the Cartesian coordinates to form the circle location value. Accordingly, the location may be provided as a point location by using the X, Y and optionally Z coordinates, or as an area location by providing also the Radius field. The additional Z-coordinate and Radius fields together may be used to form the sphere location value. A Reference Offset field may be used to form a relative location value with respect to the baseline location provided by the X, Y and Z coordinates and, optionally, the Radius. This may be particularly useful in an indoor environment. The baseline location value includes the X-Coordinate field and the Y-Coordinate field and may also include the Z-Coordinate field and/or the Radius field. The baseline location value could be precise enough to specify a building that contains the relative location, and the Reference Offset could specify a point within the building from which the offset is measured. Each of the Z-coordinate field, the Radius field, and the Reference Offset field may contain a 4 octet single precision floating point value.

FIG. 6 illustrates an embodiment of an apparatus comprising means for carrying out the above-mentioned functionalities of the scanning device. As described above, the definition "scanning device" merely describes the role of a wireless device. The wireless device may comply with specifications of an IEEE 802.11 network or another wireless network, e.g. it may be a STA. The wireless device may also be a cognitive radio apparatus capable of adapting its operation to a changing radio environment, e.g. to changes in parameters of another system on the same frequency band. The wireless device may be or may be comprised in a computer (PC), a laptop, a tablet computer, a cellular phone, a palm computer, or any other apparatus provided with radio communication capability. In another embodiment, the apparatus carrying out the above-described functionalities of the scanning device is comprised in such a wireless device, e.g. the apparatus may comprise a circuitry, e.g. a chip, a processor, a micro controller, or a combination of such circuitries in the wireless device.

Referring to FIG. 6, the apparatus may comprise a communication controller circuitry 10 configured to control wireless communications in the wireless device. The communication controller circuitry 10 may comprise a control part 14 handling control signalling communication with respect to transmission, reception, and extraction of control or management frames including the downlink frames indicating their respective transmission powers, the probe request messages, and the probe response messages, as described above. The communication controller circuitry 10 may further comprise a data part 16 that handles transmission and reception of payload data during transmission opportunities of the wireless device (transmission) or transmission opportunities of other wireless devices (reception). The communication controller circuitry 10 may further comprise a transmission power controller circuitry 14 configured to control the transmission power of the messages transmitted by at least the control part 12. In an embodiment, the control part 12 carrying out passive scanning during a network discovery process forwards contents of any passive scanning messages it has detected, e.g. beacon messages and/or measurement pilot messages, to the transmission power controller. The control part 12 may forward at least the transmission power and reception power of each passive scanning message to the transmission power controller circuitry 14. The transmission power controller circuitry 14 may then derive the closest access point and compute a transmission power that is sufficient to reach at least the closest access point. This may be determined on the basis of the transmission power values of the received passive scanning messages, location information contained in the received passive scanning messages, or both. In some embodiments, the transmission power controller circuitry 14 determines a set of closest access points that is to be reached and computes the transmission power accordingly. The transmission power controller circuitry may then output a transmission power control parameter to the control part 12 for use in transmission of an active scanning message, e.g. the probe request.

The communication control circuitry 10 may further comprise a carrier sensing (CS) threshold controller circuitry 18 configured to control carrier sensing threshold parameters for use in a CSMA/CA procedure carried out by the control part 12 and the data part 16 before the transmission of frames. The transmission power controller circuitry 14 may output the determined transmission power also to the CS threshold controller circuitry 18, and the CS threshold controller circuitry 18 may then map the transmission power to at least one CS threshold, e.g. at least one of the carrier sensing header threshold and the carrier sensing data unit threshold. A memory 20 may store a mapping table linking each transmission power to associated carrier sensing threshold value(s). The CS threshold controller circuitry may then output the determined CS threshold value(s) to the control part 12 for use in the CCA procedure preceding the transmission of the active scanning message.

In an embodiment, the control part 12 is configured to insert into the active scanning message an information element indicating the transmission power of the active scanning message in order to enable responding access point(s) to reduce the transmission power of the active scanning response message(s).

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise the memory 20 that stores computer programs (software) configuring the apparatus to perform the above-described functionalities of the wireless device. The memory 20 may also store communication parameters and other information needed for the wireless communications. The apparatus may further comprise radio interface components 22 providing the apparatus with radio communication capabilities within one or more wireless networks. The radio interface components 22 may comprise standard well-known components such as an amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the wireless device comprises at least one processor and at least one memory including a computer program code, wherein the at least one memory and the computer program code are configured, with the at least one processor, to cause the apparatus to carry out the functionalities of the wireless scanning device according to any one of the embodiments of FIGS. 2 to 5B. Accordingly, the at least one processor, the memory, and the computer program code form processing means for carrying out embodiments of the present invention in the wireless device.

FIG. 7 illustrates an embodiment of an apparatus comprising means for carrying out the above-mentioned functionalities of the access point or, in general, and advertising or responding device. The access point may be a wireless device which complies with specifications of an IEEE 802.11 network or another wireless network. The wireless apparatus may also be a cognitive radio apparatus capable of adapting its operation to a changing radio environment, e.g. to changes in parameters of another system on the same frequency band. The wireless apparatus may be or may be comprised in a computer (PC), a laptop, a tablet computer, a cellular phone, a palm computer, a base station with routing functionalities, or any other apparatus provided with radio communication capability. In another embodiment, the apparatus carrying out the above-described functionalities of the access point is comprised in such a wireless device, e.g. the apparatus may comprise a circuitry, e.g. a chip, a processor, a micro controller, or a combination of such circuitries in the wireless device.

Referring to FIG. 7, the apparatus may comprise a communication controller circuitry 50 configured to control wireless communications in the wireless device. The communication controller circuitry 50 may comprise a control part 52 handling control signalling communication with respect to transmission, reception, and extraction of control or management frames including the beacon frames, measurement pilot frames, and probe response or scanning response messages, as described above. The communication controller circuitry 50 may further comprise a data part 56 that handles transmission and reception of payload data during transmission opportunities of the wireless device (transmission) or transmission opportunities of other wireless devices (reception). The communication controller circuitry 50 may further comprise a transmission power controller circuitry 54 configured to control the transmission power of the messages transmitted by at least the control part 52. In an embodiment, the control part 52 forwards contents of any scanning request message it has detected, e.g. probe request message, to the transmission power controller circuitry 54. The control part 52 may forward at least the transmission power and reception power of the scanning request message to the transmission power controller circuitry 54. The transmission power controller circuitry 54 may then determine a transmission power that is sufficient to reach the wireless device which transmitted the scanning request message. This may be determined on the basis of the transmission power value and the reception power value of the received scanning request messages, e.g. by computing a path loss and determining a signal level required for correct reception in the transmitter of the scanning request. The transmission power controller circuitry may then output a transmission power control parameter to the control part 52 for use in transmission of a scanning response message, e.g. the probe response.

The communication controller circuitry 50 may further comprise a scanning message processor 58 configured to determine contents of scanning messages transmitted from the access point, e.g. contents of beacon, measurement pilot, and scanning response messages. The scanning message processor 58 may configure the control part 52 to include any beacon and/or measurement pilot frame the field of Table 2. When the received scanning request message comprises an information element indicating that the transmitter of the scanning request requests for neighbor report, the control part may forward such an information element to the scanning message processor 58, and the scanning message processor 58 may then acquire from a neighbor database 64 comprised in a memory 60 identifiers and parameters of any neighboring wireless network or access point it has detected. The identifiers and the parameters of such neighboring wireless network(s) and/or access points and their respective parameters may then be output to the control part 52 configured to include the neighbor information in the scanning response messages, e.g. in the field of Table 1.

The circuitries 52 to 58 of the communication controller circuitry 50 may be carried out by the one or more physical circuitries or processors. In practice, the different circuitries may be realized by different computer program modules. Depending on the specifications and the design of the apparatus, the apparatus may comprise some of the circuitries 52 to 58 or all of them.

The apparatus may further comprise the memory 60 that stores computer programs (software) configuring the apparatus to perform the above-described functionalities of the access point. The memory 60 may also store communication parameters and other information needed for the wireless communications within a wireless network of the access point and with other wireless networks. The apparatus may further comprise radio interface components 62 providing the apparatus with radio communication capabilities within its wireless network and/or with other wireless networks. The radio interface components 62 may comprise standard well-known components such as an amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the wireless apparatus comprises at least one processor and at least one memory including a computer program code, wherein the at least one memory and the computer program code are configured, with the at least one processor, to cause the apparatus to carry out the functionalities of the access point according to any one of the processes described above. Accordingly, the at least one processor, the memory, and the computer program code form processing means for carrying out embodiments of the present invention in the access point.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a wireless device.

The processes or methods described in FIGS. 2 to 5B may also be carried out in the form of a computer process defined by a computer program. The computer program may be in source code form, object code form, or in some intermediate form, and it may be stored in a transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless networks defined above but also to other suitable wireless communication systems. The protocols used, the specifications of wireless networks, their network elements and terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method for network discovery, comprising:
receiving, by a wireless device, a first downlink frame from a first access point of a first wireless network, wherein the first downlink frame comprises a first field indicating a first transmission power used for transmitting the first downlink frame;
receiving, by the wireless device, a second downlink frame from a second access point of a second wireless network, wherein the second downlink frame comprises a second field indicating a second transmission power used for transmitting the second downlink frame;
determining, based on the received first downlink frame and the second downlink frame and the first transmission power and the second transmission power, which one of the first access point and the second access point is closer to the wireless device;
determining, based on the received first downlink frame and the second downlink frame and the first transmission power and the second transmission power, an uplink transmission power sufficient to reach the access point closer to the wireless device; and
causing transmission of a scanning request message querying for the access point closer to the wireless device with the determined uplink transmission power.

2. The method of claim 1, wherein determining the uplink transmission power comprises determining a minimum uplink transmission power sufficient to reach the closer access point but not the more remote access point, and wherein the determined uplink transmission power is applied to the transmission of the scanning request message.

3. The method of claim 1, wherein each one of the first downlink frame and the second downlink frame is a measurement pilot frame, a beacon frame, or a data frame.

4. The method of claim 1, wherein the wireless device is configured to carry out carrier sensing on a transmission medium before transmitting the scanning request message, the method further comprising:
determining at least one carrier sensing threshold on the basis of the determined uplink transmission power; and
using the determined carrier sensing threshold in the carrier sensing to determine whether the transmission medium is busy or free before transmitting the scanning request message.

5. The method of claim 4, wherein carrier sensing sensitivity of the wireless device, as defined by the carrier sensing threshold, is proportional to the determined uplink transmission power.

6. The method of claim 4, wherein the wireless device is configured to apply a carrier sensing header threshold applied to frame headers detected in the transmission medium and a carrier sensing data unit threshold applied to service data units detected in the transmission medium, the method further comprising determining the carrier sensing header threshold and the carrier sensing data unit threshold on the basis of the determined uplink transmission power.

7. The method of claim 6, wherein a default value of the carrier sensing data unit threshold is reduced in proportion to the determined uplink transmission power such that the higher the determined uplink transmission power is, the higher is the reduction of the carrier sensing data unit threshold, thus configuring the wireless device to be more sensitive in detection of colliding transmissions during the carrier sensing.

8. The method of claim 6, wherein a default value of the carrier sensing header threshold is reduced in proportion to the determined uplink transmission power such that the lower the determined uplink transmission power is, the higher is the reduction of the carrier sensing data unit threshold.

9. The method of claim 1 wherein said determining which one of the first access point and the second access point is closer to the wireless device comprises:
estimating a first path loss between the first access point and the wireless device on the basis of the first transmission power and a reception power of the first downlink frame;
estimating a second path loss between the second access point and the wireless device on the basis of the second transmission power and a reception power of the second downlink frame;
determining that the access point associated with the lower path loss value between the first path loss and the second path loss is the closer access point.

10. The method of claim 9, further comprising determining the uplink transmission power as a sum of the path loss associated with the closer access point and a signal level sufficient for correct reception in the closer access point.

11. An apparatus comprising:
at least one processor; and
at least one memory including a computer program code, wherein the at least one memory and the computer program code are configured, with the at least one processor, to cause the apparatus to:
acquire a first downlink frame originated from a first access point of a first wireless network, wherein the first downlink frame comprises a first field indicating a first transmission power used for transmitting the first downlink frame;
acquire a second downlink frame originated from a second access point of a second wireless network, wherein the second downlink frame comprises a second field indicating a second transmission power used for transmitting the second downlink frame;
determine, based on the received first downlink frame and the second downlink frame and the first transmission power and the second transmission power, which one of the first access point and the second access point is closer to the apparatus;
determine, based on the received first downlink frame and the second downlink frame and the first transmission power and the second transmission power, an uplink transmission power sufficient to reach the access point closer to the apparatus; and
cause transmission of a scanning request message querying for the access point closer to the apparatus with the determined uplink transmission power.

12. The apparatus of claim 11, wherein the at least one memory and the computer program code are configured, with the at least one processor, to cause the apparatus to determine the uplink transmission power by determining a minimum uplink transmission power sufficient to reach the closer access point but not the more remote access point, and to apply the determined uplink transmission power to the transmission of the scanning request message.

13. The apparatus of claim 11, wherein each one of the first downlink frame and the second downlink frame is a measurement pilot frame, a beacon frame, or a data frame.

14. The apparatus of claim 11, wherein the at least one memory and the computer program code are configured, with the at least one processor, to cause the apparatus to:
carry out carrier sensing on a transmission medium before transmitting the scanning request message;
determine at least one carrier sensing threshold on the basis of the determined uplink transmission power; and
use the determined carrier sensing threshold in the carrier sensing to determine whether the transmission medium is busy or free before transmitting the scanning request message.

15. The apparatus of claim 14, wherein carrier sensing sensitivity, as defined by the carrier sensing threshold, is proportional to the determined uplink transmission power.

16. The apparatus of claim 14, wherein the at least one memory and the computer program code are configured, with the at least one processor, to cause the apparatus to use a carrier sensing header threshold applied to frame headers detected in the transmission medium and a carrier sensing data unit threshold applied to service data units detected in the transmission medium, and to determine the carrier sensing header threshold and the carrier sensing data unit threshold on the basis of the determined uplink transmission power.

17. The apparatus of claim 16, wherein the at least one memory and the computer program code are configured, with the at least one processor, to cause the apparatus to reduce a default value of the carrier sensing data unit threshold in proportion to the determined uplink transmission power such that the higher the determined uplink transmission power is, the higher is the reduction of the carrier sensing data unit threshold, thus configuring the apparatus to be more sensitive in detection of colliding transmissions during the carrier sensing.

18. The apparatus of claim 16, wherein the at least one memory and the computer program code are configured, with the at least one processor, to cause the apparatus to reduce a default value of the carrier sensing header threshold in proportion to the determined uplink transmission power such that the lower the determined uplink transmission power is, the higher is the reduction of the carrier sensing data unit threshold.

19. The apparatus of claim 11, wherein the at least one memory and the computer program code are configured, with the at least one processor, to cause the apparatus to determine which one of the first access point and the second access point is closer to the apparatus by:
estimating a first path loss between the first access point and the apparatus on the basis of the first transmission power and a reception power of the first downlink frame;
estimating a second path loss between the second access point and the apparatus on the basis of the second transmission power and a reception power of the second downlink frame; and
determining that the access point associated with the lower path loss value between the first path loss and the second path loss is the closer access point.

20. A non-transitory computer readable memory embodying at least one computer program code, the at least one computer program code executable by at least one processor to perform a method for network discovery comprising:
acquiring a first downlink frame originated from a first access point of a first wireless network, wherein the first downlink frame comprises a first field indicating a first transmission power used for transmitting the first downlink frame;

acquiring a second downlink frame originated from a second access point of a second wireless network, wherein the second downlink frame comprises a second field indicating a second transmission power used for transmitting the second downlink frame;

determining, based on the received first downlink frame and the second downlink frame and the first transmission power and the second transmission power, which one of the first access point and the second access point is closer to an apparatus performing the method;

determining, based on the received first downlink frame and the second downlink frame and the first transmission power and the second transmission power, an uplink transmission power sufficient to reach the access point closer to the apparatus performing the method; and causing transmission of a scanning request message querying for the access point closer to the apparatus performing the method with the determined uplink transmission power.

* * * * *